United States Patent [19]
Wuerker et al.

[11] 3,801,930
[45] Apr. 2, 1974

[54] SINGLE MODE LASER OSCILLATOR WITH RING RESONATOR AND INTERNAL FARADAY ISOLATOR

[75] Inventors: Ralph F. Wuerker, Palos Verdes Estates; Lee O. Heflinger, Torrance, both of Calif.

[73] Assignee: TRW Inc., Redondo Beach, N.J.

[22] Filed: Nov. 30, 1972

[21] Appl. No.: 310,857

[52] U.S. Cl. .............................................. 331/94.5
[51] Int. Cl. .............................................. H01s 3/02
[58] Field of Search .................................. 331/94.5

[56] References Cited
UNITED STATES PATENTS

| | | | |
|---|---|---|---|
| 3,456,210 | 7/1969 | Statz et al. | 331/94.5 |
| 3,523,718 | 8/1970 | Crow | 331/94.5 |
| 3,584,312 | 6/1971 | Statz | 331/94.5 |
| 3,646,468 | 2/1972 | Buczek et al. | 331/94.5 |
| 3,691,477 | 9/1972 | Janney | 331/94.5 |

*Primary Examiner*—William L. Sikes
*Attorney, Agent, or Firm*—Donald R. Nyhagen; Edwin A. Oser; Daniel T. Anderson

[57] ABSTRACT

A standing light wave within the active lasing medium of a laser oscillator is avoided to prevent periodic bleaching of the medium and thereby foster single mode oscillation and improve coherence. The laser oscillator includes a ring resonator having a 180° optically folded portion and a ring portion containing the lasing medium and an optical rotator. The Farady isolator and optical rotator permit coherent light propagation in one direction only through the resonator cavity, such that light reflection occurs in one direction only through the lasing medium and no standing wave is created in the medium. The oppositely traveling light waves within the folded cavity portion establish a standing wave region in which may be located a bleachable mode selector, such as a dye cell, for suppressing undesired oscillating modes and thereby further improving coherence.

15 Claims, 5 Drawing Figures

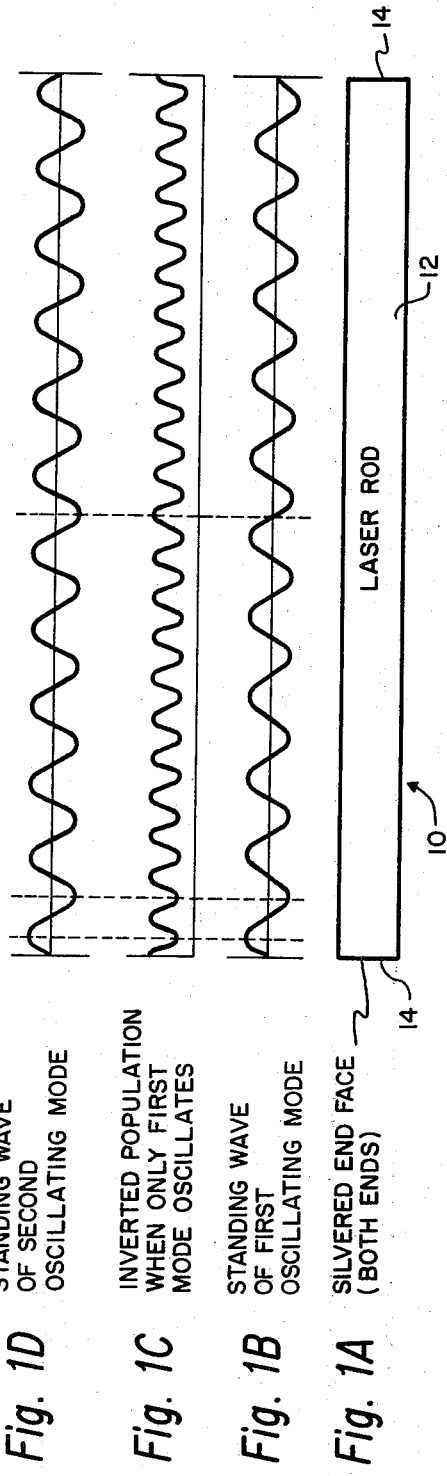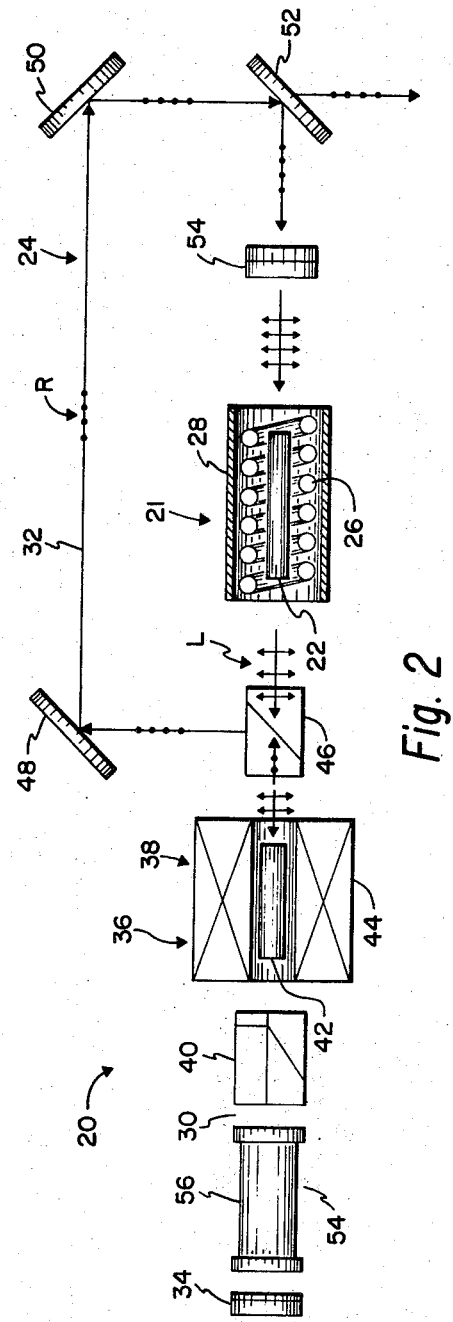

SINGLE MODE LASER OSCILLATOR WITH RING RESONATOR AND INTERNAL FARADAY ISOLATOR

RELATED APPLICATIONS

Reference is made to copending applications entitled "Single Mode Laser Oscillator with Linear Resonator and Internal Faraday Isolator," Ser. No. 310,869, filed Nov. 30, 1972; and "Single Mode Laser Oscillator with Ring Resonator and Internal Mode Selecting Dye Cell," Ser. No. 310,868, filed Nov. 30, 1972; both assigned to the same assignee as this application.

BACKGROUND OF THE INVENTION

1. Field of the Invention

This invention relates generally to laser oscillators and more particularly to a method of and means for avoiding a standing light wave in the active lasing medium of a laser oscillator to prevent periodic bleaching of the medium and thereby promote single mode oscillation and improve coherence.

2. Prior Art

It is well known that in the absence of any mode selection or control means, the coherent light from the active lasing medium of a laser oscillator is composed of a plurality of discrete frequency componetns or longitudinal modes which are distributed over the frequency range or lasing line width of the lasing medium. Such multiple longitudinal modes reduce the temporal coherence length of the laser beam. This coherence length may be defined as the maximum path length difference which two laser beams from the same source may be mismatched and still interfere.

Coherence length is unimportant in some laser applications. In other applications, on the other hand, notably holography, high coherence, that is relatively long coherence length, is either highly desirable or absolutely essential. For this reason, laser oscillators which are used in these high coherence applications are equipped with means, commonly referred to as mode selectors or controllers, for suppressing all but a most favored oscillating mode. Well known examples of mode controllers are etalons and saturable absorbers, such as dye cells.

The mode controlling actions of etalons and dye cells are well understood and hence need not be explained in detail. Suffice it to say that etalons effect mode control by a light wave interference action and saturable absorbers by a periodic bleaching action produced by the most favored longitudinal mode. This bleaching action lowers the loss for the favored mode but retains the loss for other modes relatively high.

While such mode controllers improve coherence, certain lasing mediums, particularly solid-state lasers such as ruby lasers, experience periodic de-inversion or de-population, referred to herein as periodic bleaching, which promotes multi-mode oscillation and reduces coherence. In other words, such lasing mediums act as anti-coherence elements. This anti-coherence action is explained, for example, on pages 273–282 of Volume 10a, entitled "Laser — A Collection of Reprints with Commentary" of the International Science Review Series, published in 1968 by Gordon and Breach, Science Publishers, New York. Accordingly, it is unnecessary to explain the action in great detail. Suffice it to say that the anti-coherence action results from the fact that the light waves of an initial oscillating mode traveling in opposite directions through the lasing medium of a conventional laser oscillator have parallel planes of vibration and hence create a standing light wave in the medium. This standing light wave causes periodic bleaching, i.e., depopulation, of the medium by induced emission which varies between a minimum at the nodes and a maximum at the antinodes of the standing wave. Accordingly, the inverted population varies between a maximum at the nodes and a minimum at the anti-nodes. This inverted population distribution is most unfavorable for the initial oscillating mode and tends to foster other modes which may commence and thus destroy mode control.

It will now be understood, therefore, that effective single mode operation of a laser oscillator requires not only mode selection or control to suppress undesired longitudinal oscillating modes, but also avoidance of a standing wave in the medium which would cause periodic bleaching of the medium.

The earlier mentioned reference from the Science Review Series describes a solid-state traveling wave laser oscillator which avoids a standing wave in the laser crystal and thereby periodic bleaching of the crystal. Simply stated, this traveling wave laser has a ring resonator containing a Faraday isolator which permits propagation of light waves in only one direction through the resonator cavity. Accordingly, light wave propagation occurs essentially in only one direction through the laser crystal, thus avoiding the formation of a standing wave in the crystal and producing uniform bleaching of the crystal.

SUMMARY OF THE INVENTION

This invention provides an improved laser oscillator of the kind which utilizes a ring resonator to effect light wave propagation in one direction only through the lasing medium for the purpose of avoiding a standing light wave in and periodic bleaching of the medium and thereby promoting single mode oscillation and improving coherence. This new ring resonator is unique in that it has a 180° optically folded portion and a ring portion. The folded portion of the resonator contains an end reflector and a Faraday isolator. The ring portion of the resonator contains the lasing medium, an optical polarization changing means, referred to herein as a 90° optical rotator, such as a half-wave plate, and additional reflectors for directing light waves through the ring cavity portion.

Light waves propagate from one end of the lasing medium through the Faraday isolator to the adjacent cavity end reflector and are then reflected back through the isolator. The direction of polarization of the light waves is changed through a total angle of 90° during their initial passage and subsequent reflection through the isolator. The reflected waves emerging from the Faraday isolator are directed through the ring portion of the resonator to the opposite ends of the lasing medium and then travel through the medium to repeat the cycle. During their propagation through the resonator ring portion, the waves pass through the 90° optical rotator. This rotator changes through 90° the polarization direction of the waves which thus travel through the lasing medium in their original plane of vibration.

Light waves which propagate from the latter end of the lasing medium are directed through the ring portion of the resonator and then through the Faraday isolator in the folded portion of the resonator. The isolator reflects these latter waves from the resonator cavity, thus preventing their reflection back through the lasing medium in the opposite direction to the earlier mentioned reflected waves.

Accordingly, light wave propagation occurs in one direction only through the lasing medium. A standing light wave in and periodic bleaching of the medium are thus avoided to promote single mode oscillation and improve coherence.

Parallel polarized light waves travel in opposite directions through the folded portion of the resonator cavity between the Faraday isolator and adjacent cavity end reflector to create a standing light wave in this region. According to a feature of the invention, a mode selector, such as a dye cell or other saturable absorber, may be located in this standing wave region to suppress undesired oscillating modes.

BRIEF DESCRIPTION OF THE DRAWINGS

FIGS. 1A through 1D depict the anti-coherence action of the lasing medium of a conventional laser oscillator; and FIG. 2 illustrates an improved single mode laser oscillator according to the invention.

DESCRIPTION OF THE PREFERRED EMBODIMENTS

FIG. 1A illustrates a conventional laser oscillator 10 having an active lasing medium 12, in this case a solid-state medium such as a ruby rod, with silvered end faces 14. The pumping means for the lasing medium has been omitted for clarity. During operation of the laser oscillator, plane polarized coherent light is reflected back and forth between the end faces 14, resulting in oppositely traveling light waves in the medium. These light waves have parallel planes of vibration, and assuming the existence of a single initial oscillating mode, give rise to a standing light wave (FIG. 1B) in the medium. The induced emission produced by this standing wave varies between a minimum, i.e., zero, at the nodes and a maximum at the anti-nodes of the standing wave, thus causing corresponding periodic bleaching of the lasing medium and creating the inverted population distribution of FIG. 1C.

It will be observed that the resulting inverted population density varies between a maximum at the nodes and a minimum at the anti-nodes of the standing wave. This inverted population distribution is obviously unfavorable to the initial oscillating mode which created the distribution and favors other longitudinal modes, particularly that of FIG. 1D whose electric field has a maximum coinciding with a maximum of the inverted population density at the center of the lasing medium. This second mode will thus have more gain than the initial mode and hence will go into oscillation. The two oscillating modes will then produce a new standing wave in the lasing medium which will cause corresponding periodic bleaching of the medium favoring initiation of a third oscillating mode. Additional oscillating modes may be initiated by repetition of this action, resulting in multi-mode operation of the laser oscillation.

The lasing medium in a conventional laser oscillator thus fosters multiple oscillating modes. As noted earlier and as well known to those versed in the art, such multiple modes reduce the coherence length of the oscillator which is undesirable or totally unacceptable for certain laser applications, such as holography. In other words, the lasing medium acts as an anti-coherence element.

The laser oscillator of this invention is designed to suppress or eliminate this anti-coherence action. Turning to FIG. 2, the illustrated laser oscillator 20 has a laser 21, including a lasing medium 22, in this case a solid-state lasing medium such as a ruby rod, contained within an optical resonator 24. Surrounding the laser rod is an optical pumping means 26, such as a helical Xenon flash lamp. A cylindrical reflector 28 surrounds the flash lamp.

Resonator 24 is essentially a ring resonator having a 180° optically folded portion 30 at the left end and on the axis of the laser 21 and a ring portion 32 containing the laser. At the left end of the folded resonator portion 30 is a cavity reflector 34 having its reflecting face normal to the axis of the laser.

Located within the folded resonator portion 30, between the laser 21 and the cavity reflector 34, is a Faraday isolator 36. This Faraday isolator is well-known and hence need not be described in elaborate detail. Suffice it to say that the isolator includes a Faraday rotator 38 and an optical polarizer 40, such as a Glan polarizer. Faraday rotator 38 has a rod 42 of transparent Faraday material such as lead glass with a high Verdet constant on the axis of the laser and a magnetic coil 44 about the Faraday rod. Coil 44, when energized, creates within the Faraday rod an electromagnetic field which rotates the plane of polarization of light waves propagating through the rod. A second optical polarizer 46 is located between the laser 21 and the Faraday rotator 38. This second polarizer is situated in both the folded and ring portions 30, 32 of the resonator 24.

Located within the ring portion 32 of the resonator 24 are three 45° reflectors 48, 50, 52. Reflector 52 is situated on the axis of laser 21. Reflectors 48 and 50 are laterally spaced from the axis and located opposite the polarizer 46 and reflector 52, respectively. Reflector 34 is the rear 99 percent reflector and reflector 52 the output reflector of the resonator. Between the output reflector 52 and the laser 21 is a 90° optical rotator 54 which, in this instance, is a half-wave plate.

The operation of the laser oscillator will now be described. In this description, it is assumed that the coherent light produced by the laser 21 when its lasing medium or rod 22 is pumped by the flash lamp 26 is vertically polarized, that is polarized with the plane of vibration of the light waves parallel to the plane of the paper. Polarizer 46 is oriented with its plane of maximum light transmission parallel to this plane of vibration. Accordingly, left traveling light waves L propagating from the left end of the laser rod 22 pass through the polarizer and then through the rotator 38 of the Faraday isolator 36.

As noted earlier, a voltage is impressed on the coil 44 of the Faraday rotator 38 to change the direction of polarization of light waves propagating through the rotator. This rotator is a non-reciprocal optical element which rotates the plane of vibration of the waves in the same direction during both left-hand and right-hand transit of the light waves through the rotator. The voltage impressed on the rotator coil is such that the vibration plane is rotated 45° during each transit.

Accordingly, during initial left-hand transit of the left traveling vertically polarized light waves L through the Faraday rotator 38, their plane of vibration is rotated 45° in one direction from the vertical. The polarizer 40 of the Faraday isolator 36 is oriented with its plane of maximum light transmission parallel to the 45° vibration plane of the left traveling waves emerging from the rotator. These waves thus pass through the polarizer 40 to the cavity end reflector 34 and are then reflected back through the polarizer and Faraday rotator. During reflection of the waves through the Faraday rotator 38, their vibration plane is rotated an additional 45°. Accordingly, the right traveling light waves emerging from the Faraday rotator are horizontally polarized and reflect from the polarizer 46 into the ring portion 32 of the resonator 24 as right traveling horizontally polarized waves R.

Resonator reflectors 48, 50 and 52 direct these horizontally polarized light waves through the resonator ring portion 32 to the right end of the laser rod 22. During their final left-hand travel from the output reflector 50 toward the laser rod, along the axis of the rod, these light waves pass through the optical rotator or half-wave plate 54. This half-wave plate rotates the plane of vibration of the light waves through a 90° angle. Accordingly, the light waves are restored to and travel to the left through the laser rod 22 with their initial vertical polarization to repeat the cycle.

Consider now vertically polarized light waves which propagate from the right end of the laser rod 22. The direction of polarization of these waves is changed 90° to a horizontal polarization during their passage through the half-wave plate 54. These horizontally polarized waves are then directed through the resonator ring portion 32 to the polarizer 46 and from the polarizer to the left through the folded resonator portion 30. During left-hand transit of the waves through the Faraday rotator 38, their vibration plane is rotated 45° into the reflection plane of the polarizer 40. Accordingly, the waves are reflected from the resonator cavity by the latter polarizer.

It is now evident that during operation of the laser oscillator 20, vertically polarized light waves propagating from the left end of the laser rod 22 are reflected back through the rod, from right to left, with a vertical polarization and are thus amplified by stimulated emission. Vertically polarized light waves propagating from the right end of the laser rod, on the other hand, are reflected from the resonator cavity by the Faraday isolator 36. Accordingly, light wave propagation occurs in one direction only through the laser rod. A standing light wave in and periodic bleaching of the laser rod are thus avoided, thereby promoting single mode oscillation and improving coherence.

From the earlier description, it will be understood that the region 54 of the resonator cavity between the cavity end reflector 34 and polarizer 40 contains oppositely traveling, parallel polarized light waves. These waves thus establish a standing light wave in the region. According to a feature of the invention, a mode selector 56 such as a chlorophyll dye cell is located in the standing wave region 54 to suppress undesired oscillating modes and thereby further improve coherence.

What is claimed as new in support of letters Patent is:

1. A high coherence laser oscillator having a non-standing wave gain region; comprising:
    a lasing medium which produces plane polarized coherent light having a given plane of vibration;
    means for pumping said medium to cause the medium to lase;
    a ring resonator containing said medium including means for directing the coherent light propagating from one end of said medium to the opposite end of the medium along a light path having a 180° optically folded portion along which the light waves travel first in one direction and then in the opposite direction;
    means for changing the direction of polarization of the light waves traveling in each direction through a first position along said folded path portion through an angle of 45° in the same direction of rotation;
    means for changing the direction of polarization of the light waves traveling in each direction through a second position along said path between said first position and said opposite end of said medium through an angle of 90°; and
    means for blocking reflection through said medium of light waves propagating from said opposite end of said lasing medium in said given plane of vibration.

2. A laser oscillator according to claim 1 wherein:
    the oppositely traveling light waves in a region of said folded path portion create a standing wave in said region; and
    a saturable absorber in said standing wave region to suppress undesired oscillating modes.

3. A laser oscillator according to claim 1 wherein:
    said first mentioned polarization changing means comprises a Faraday rotator.

4. A laser oscillator according to claim 3 wherein:
    said second mentioned polarization changing means comprises a half-wave plate.

5. A laser oscillator according to claim 4 wherein:
    said lasing medium comprises a solid medium such as a ruby.

6. A high coherence laser oscillator with a non-standing wave gain region, comprising:
    an active lasing medium for producing plane polarized coherent light having a given plane of vibration;
    means for pumping said medium to cause the medium to lase;
    a ring resonator having a 180° optically folded portion located at one end and on the axis of said medium and a ring portion containing said medium;
    a first reflector at the end of said folded resonator portion and normal to said axis;
    a first optical polarizer on said axis between said medium and reflector;
    a Faraday isolator in said folded resonator portion between said medium and reflector including a Faraday rotator and a second optical polarizer between said rotator and reflector;
    a 90° optical rotator in said resonator ring portion;
    the light transmission plane of said first polarizer being parallel to said vibration plane, and the light transmission plane of said second polarizer being angularly displaced 45° from said planes, whereby said Faraday rotator may be energized to effect light wave propagation from said one end of said medium, through said folded resonator portion to said reflector and back through said folded resonator portion to said first polarizer, and reflection of the light waves from said first polarizer laterally of said axis; and additional reflectors in said resonator ring portion for directing the reflected light waves from said first polarizer through said 90° rotator to said opposite end of said medium.

7. A laser oscillator according to claim 6, wherein: said lasing medium is a solid-state medium such as a ruby.

8. A laser oscillator according to claim 6, wherein: a standing wave region exists between said isolator and said first reflector; and
a mode selector in said region.

9. A laser oscillator according to claim 8, wherein: said mode selector is a saturable absorber such as a chlorophyll dye cell.

10. A laser oscillator according to claim 6, wherein:

said additional resonator reflectors include an output reflector in the axis of said lasing medium.

11. A laser oscillator according to claim 10, wherein: said 90° optical rotator is located between said medium and output reflector.

12. A laser oscillator according to claim 6, wherein: said 90° rotator is a half-wave plate.

13. A laser oscillator according to claim 6, wherein:

said lasing medium is a solid-state medium such as a ruby;
a standing wave region exists between said isolator and said first reflector;
a saturable absorber such as a chlorophyll dye cell in said region;
said additional cavity reflectors include an output reflector on the axis of said medium;
said 90° rotator is a half-wave plate located between said medium and output reflector.

14. The method of avoiding a standing light wave in the active lasing medium of a laser oscillator to avoid periodic bleaching of the medium and thereby improve coherence, comprising the steps of:

directing the coherent light propagating from one end of said medium around and to the opposite end of the medium along a light path having a 180° optically folded portion along which the light waves travel initially in one direction to a terminal position and then in the opposite direction away from said position;

changing the direction of polarization of the light waves traveling in each direction through a second position along said path portion through an angle of 45° in the same direction of rotation;

chaging the direction of polarization of the light waves traveling in each direction through a position along said path between said second position and said opposite end of said medium through an angle of 90°; and blocking reflection through said medium of light waves propagating from said opposite end of said lasing medium in said given plane of vibration.

15. The method according to claim 14 wherein:

the oppositely traveling light waves in a region of said folded path portion create a standing wave in said region; and said method includes the further step of exposing a saturable absorber to the standing wave in said region to suppress undesired oscillating modes.

* * * * *